United States Patent
Cai et al.

(10) Patent No.: US 12,439,498 B2
(45) Date of Patent: Oct. 7, 2025

(54) POWER CONSUMPTION CONTROL CIRCUIT, CHIP AND ELECTRONIC DEVICE

(71) Applicant: CRM ICBG (WUXI) CO., LTD., Wuxi (CN)

(72) Inventors: Pengfei Cai, Wuxi (CN); Sheng Zhou, Wuxi (CN); Dongmin Ding, Wuxi (CN); Zhenli Liu, Wuxi (CN); Sida Liu, Wuxi (CN); Weiyou Peng, Wuxi (CN)

(73) Assignee: CRM ICBG (wuxi) Co., ltd., Jiangsu (CN)

( * ) Notice: Subject to any disclaimer, the term of this patent is extended or adjusted under 35 U.S.C. 154(b) by 0 days.

(21) Appl. No.: 18/878,092

(22) PCT Filed: Aug. 23, 2023

(86) PCT No.: PCT/CN2023/114382
§ 371 (c)(1),
(2) Date: Dec. 23, 2024

(87) PCT Pub. No.: WO2024/078147
PCT Pub. Date: Apr. 18, 2024

(65) Prior Publication Data
US 2025/0240861 A1   Jul. 24, 2025

(30) Foreign Application Priority Data
Oct. 13, 2022 (CN) .......................... 202211254231.6

(51) Int. Cl.
*H05B 47/165* (2020.01)
*G06F 1/32* (2019.01)
(Continued)

(52) U.S. Cl.
CPC .......... *H05B 47/165* (2020.01); *H05B 45/30* (2020.01); *H05B 47/17* (2020.01); *G06F 1/32* (2013.01)

(58) Field of Classification Search
CPC ...... H05B 47/165; H05B 45/30; H05B 47/17; G06F 1/32
See application file for complete search history.

(56) References Cited

U.S. PATENT DOCUMENTS 6,008,686 A * 12/1999 Suda ....................... G06F 1/206
327/512
2015/0228239 A1   8/2015 Tanaka et al.

FOREIGN PATENT DOCUMENTS

CN   102446490 A   5/2012
CN   104793723 A   7/2015
(Continued)

*Primary Examiner* — Daniel D Chang
(74) *Attorney, Agent, or Firm* — IPRTOP LLC

(57) ABSTRACT

A power consumption control circuit, a chip, and an electronic device; the circuit includes: a data serial-to-parallel module that converts serial input data into parallel data and sequentially outputs the least significant bit of the parallel data; a data counting module that generates a valid flag bit when the number of valid data bits in the serial data reaches a preset value; a data latch control module that generates a valid latch pulse after the to-be-controlled circuit completes the reception and transmission of data; a power consumption mode determination module that generates a power consumption control signal for the to-be-controlled circuit; when valid data is received and there is a need to control the downstream circuit, the power consumption control signal switches the to-be-controlled circuit into working mode; otherwise, the power consumption control signal switches the to-be-controlled circuit into power-saving mode.

15 Claims, 2 Drawing Sheets

(51) Int. Cl.
    *H05B 45/30*    (2020.01)
    *H05B 47/17*    (2020.01)

(56)        References Cited

FOREIGN PATENT DOCUMENTS

| | | |
|---|---|---|
| CN | 104852712 A | 8/2015 |
| CN | 106802709 A | 6/2017 |
| CN | 107066250 A | 8/2017 |
| CN | 109669524 A | 4/2019 |
| CN | 109842402 A | 6/2019 |
| CN | 111061358 A | 4/2020 |
| CN | 111429833 A | 7/2020 |
| CN | 112583995 A | 3/2021 |
| JP | H11134858 A | 5/1999 |

\* cited by examiner

POWER CONSUMPTION CONTROL CIRCUIT, CHIP AND ELECTRONIC DEVICE

CROSS REFERENCE TO RELATED APPLICATION

The present disclosure claims the benefit of priority to Chinese Patent Application No. CN 202211254231.6, entitled "Power Consumption Control Circuit, Chip and Electronic Device", filed with CNIPA on Thursday, Oct. 13, 2022, the disclosure of which is incorporated herein by reference in its entirety for all purposes.

FIELD OF TECHNOLOGY

The present disclosure relates to the field of integrated circuit design, in particular it relates to a power consumption control circuit, a chip and an electronic device.

BACKGROUND

In current mainstream LED lighting circuit designs, after power-up, the LED driver chip (circuit) consumes a certain working current, regardless of whether it receives data or whether the LED needs to be lit. The size of this current typically ranges around 1 mA. When the LED driver chip is used in portable electronic devices, the working current consumed by the LED driver chip (circuit) itself, which always exists, reduces the battery runtime of the electronic device (especially portable devices).

Therefore, reducing the working current consumed by the LED driver chip (circuit) in the non-working state and extending the battery runtime of electronic devices equipped with the LED driver chip (circuit) has become an urgent problem to be solved by those skilled in the art.

SUMMARY

In view of the drawbacks of the related technologies described above, the present disclosure provides a power consumption control circuit, chip, and electronic device, which aim to address the issue of LED driver circuits (chips) in the related technologies consuming working current in a non-working state, thereby affecting battery life.

To achieve these and other related purposes, the present disclosure provides a power consumption control circuit, for controlling a power consumption of a to-be-controlled circuit, wherein the power consumption control circuit includes:

A data serial-to-parallel module, a data counting module, a data latch control module, and a power consumption mode determination module.

The data serial-to-parallel module receives serial input data from the to-be-controlled circuit, converts the serial input data into parallel data, and sequentially outputs least significant bits of the parallel data, wherein the to-be-controlled circuit controls a downstream circuit based on the serial input data:

The data counting module receives the serial input data and counts a quantity of valid data bits of the serial input data, generating a valid flag bit when the quantity of valid data bits reaches a preset value.

The data latch control module generates a valid latch pulse after the to-be-controlled circuit completes reception and transmission of data.

The power consumption mode determination module is connected to output terminals of the data serial-to-parallel module, the data counting module, and the data latch control module, the power consumption mode determination module receives the serial input data and a power-on reset signal of the to-be-controlled circuit, and generates a power consumption control signal for the to-be-controlled circuit; and the to-be-controlled circuit enters a working mode when valid data is received and it is necessary to control the downstream circuit; otherwise, the to-be-controlled circuit enters a power-saving mode.

Optionally, the data serial-to-parallel module includes N trigger units and a logic unit.

The logic unit receives the power-on reset signal and the latch pulse, and generates a first reset signal when the power-on reset signal or the latch pulse is valid.

The trigger units are connected in series, each of which has a clock terminal connected to a clock signal and a reset terminal connected to the first reset signal; a triggering based on the clock signal sequentially transmits bits of the serial input data.

N is a natural number greater than or equal to 1.

More optionally, the logic unit is a NOR gate or a NAND gate.

More optionally, the trigger unit is a D flip-flop.

More optionally, when the to-be-controlled circuit is an LED driver circuit, the preset value is equal to M*R, wherein M is a quantity of LED channels and R is a bit depth of grayscale data for each LED channel; wherein M is a natural number greater than or equal to and R is a natural number greater than or equal to 1.

More optionally, the power consumption mode determination module includes a data determination unit, a power consumption mode determination result latch unit, and a reset unit.

The data determination unit determines whether the to-be-controlled circuit has received valid data and whether it is necessary to control the downstream circuit, based on output signals from the data serial-to-parallel module and the data counting module, and resets the data determination unit when the power-on reset signal or the latch pulse is valid.

The power consumption mode determination result latch unit generates the power consumption control signal based on an output signal from the data determination unit and the latch pulse.

The reset unit is connected to an output terminal of the power consumption mode determination result latch unit and receives the power-on reset signal, generating a second reset signal when the power-on reset signal is valid or when the to-be-controlled circuit transitions from the working mode to the power-saving mode, to reset the data determination unit and the power consumption mode determination result latch unit.

More optionally, the data determination unit includes a first RS flip-flop and a first D flip-flop; wherein a first reset terminal of the first RS flip-flop receives the power-on reset signal, a second reset terminal of the first RS flip-flop receives the latch pulse, and a set terminal of the first RS flip-flop is connected to an output terminal of the data serial-to-parallel module; wherein a data input terminal of the first D flip-flop is connected to an output terminal of the first RS flip-flop, the clock terminal of the first D flip-flop receives the flag bit, a reset terminal of the first D flip-flop receives the second reset signal, and an inverted output terminal of the first D flip-flop serves as an output terminal of the data determination unit.

More optionally, the power consumption mode determination result latch unit includes a second D flip-flop and a second RS flip-flop; wherein a data input terminal of the second D flip-flop is connected to the output terminal of the data determination unit, a clock terminal of the second D flip-flop receives the latch pulse, and a reset terminal of the second D flip-flop receives the second reset signal; wherein a first reset terminal of the second RS flip-flop is connected to an output terminal of the second D flip-flop, a second reset terminal of the second RS flip-flop receives the power-on reset signal, a set terminal of the second RS flip-flop receives the serial input data, and an output terminal of the second RS flip-flop outputs the power consumption control signal.

More optionally, the reset unit includes an inverter and a second NOR gate; an input terminal of the inverter is connected to the power consumption control signal, and the output terminal of the inverter is connected to a first input terminal of the second NOR gate; and a second input terminal of the second NOR gate receives the power-on reset signal and outputs the second reset signal.

To achieve the above and other related purposes, the present disclosure also provides a chip, said chip including: the power consumption control circuit.

To achieve the above and other related purposes, the present disclosure also provides an electronic device, said electronic device including: the to-be-controlled circuit and the power consumption control circuit.

Optionally, the to-be-controlled circuit is a LED driver circuit.

As described above, the power consumption control circuit, the chip and the electronic device according to the present disclosure has the following advantages:

1. The power consumption control circuit, the chip, and the electronic device according to the present disclosure allow the to-be-controlled circuit to enter a power-saving mode as soon as power is applied to the to-be-controlled circuit, when the to-be-controlled circuit receives data, valid data, and requires control of the downstream circuit, it switches to normal working mode, said to-be-controlled circuit significantly reduces the standby power consumption of the electronic device.
2. The power consumption control circuit, the chip, and the electronic device according to the present disclosure achieve effective determination of multiple data types (whether data has been received, whether valid data has been received, and whether control of the downstream circuit is required) with minimal circuit resource consumption, resulting in low cost and high accuracy.
3. The power consumption control circuit and the chip according to the present disclosure make the to-be-controlled circuit more suitable for application scenarios in portable electronic devices.

REFERENCE NUMERALS

Figure 1:
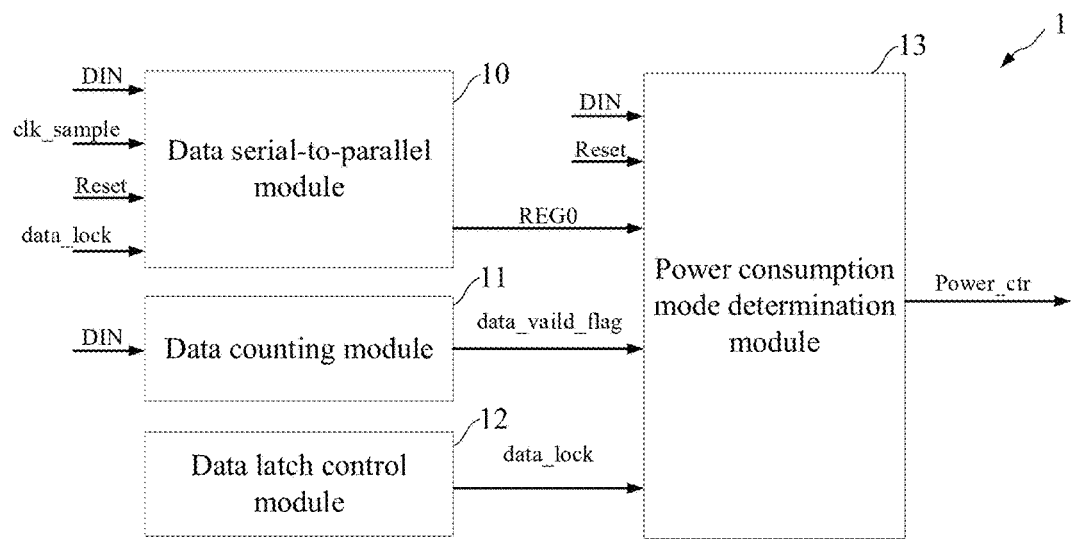
FIG. 1 shows a schematic structural diagram of a power consumption control circuit according to one embodiment of the present disclosure.

1 Power consumption control circuit
10 Data serial-to-parallel module
101 Trigger unit
102 Logic unit
11 Data counting module
12 Data latch control module
13 Power consumption mode determination module
131 Data determination unit
131a First RS flip-flop
131b First D flip-flop
132 Power consumption mode determination result latch unit
132a Second D flip-flop
132b Second RS flip-flop
133 Reset unit
2 LED driver circuit

DETAILED DESCRIPTION

The embodiments of the present disclosure will be described below. Those skilled can easily understand disclosure advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Referring to FIGS. 1-4. It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the layout of components may also be more complicated.

As shown in FIG. 1, the present disclosure provides a power consumption control circuit 1, the power consumption control circuit 1 is used to control the power consumption of a to-be-controlled circuit, in one example, the to-be-controlled circuit is an LED driver circuit, in practical applications, any circuit that operates based on serial input data is applicable to the present disclosure; the power consumption control circuit 1 includes:

A data serial-to-parallel module 10, a data counting module 11, a data latch control module 12, and a power consumption mode determination module 13.

As shown in FIG. 1, the data serial-to-parallel module 10 receives a serial input data DIN from a LED driver circuit (to-be-controlled circuit), converts the serial input data DIN into parallel data, and sequentially outputs least significant bits REG0 of the parallel data.

It should be noted that the to-be-controlled circuit uses the serial input data DIN to control the downstream circuits of the to-be-controlled circuit. In one example, the serial input data DIN contains the grayscale information of the LED lights driven by the LED driver circuit.

Specifically, in one example, the data serial-to-parallel module 10 also receives the power-on reset signal Reset from the LED driver circuit and the latch pulse data_lock provided by the data latch control module 12, when the power-on reset signal Reset or the latch pulse data_lock is valid (i.e., power-on reset or data latching), the data serial-to-parallel module 10 is reset.

Figure 2:
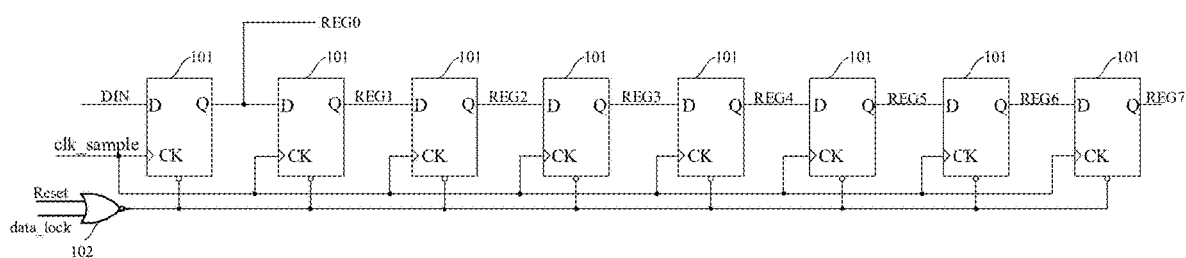
FIG. 2 shows a schematic structural diagram of a data serial-to-parallel module according to one embodiment of the present disclosure.

Specifically, in one example, the data serial-to-parallel module 10 is implemented using a set of shift registers. For example, as shown in FIG. 2, the data serial-to-parallel module includes N trigger units 101 and a logic unit 102, corresponding to the bit count of the grayscale data for the LED channels (N can be defined based on actual application scenarios and is not limited to this example). N is a natural number greater than or equal to 1, and in one example, N=8. The logic unit 102 receives the power-on reset signal Reset and the latch pulse data_lock; when the power-on reset signal Reset or the latch pulse data_lock is valid, the logic unit 102 generates the first reset signal. In one example, the logic unit 102 is implemented using a NOR gate. The power-on reset signal Reset and the latch pulse data_lock are active-high, and the first reset signal is active-low. In practical use, the circuit structure of the logic unit 102 can be configured according to requirements, as long as it can achieve the logical relationships required by the present disclosure. The trigger units 101 are connected in series, each having a clock terminal CK connected to a clock signal clk_sample, and a reset terminal connected to a first reset signal, and data bits from the serial input data DIN are sequentially transferred based on the triggering of the clock signal clk_sample. Data outputs from the trigger units, from high to low, are labeled REG7, REG6, REG5, REG4, REG3, REG2, REG1, REG0; with each arrival (i.e., each pulse) of the clock signal clk_sample, the least significant bit REG0 of the circuit output changes so as to sequentially correspond to each data bit in the serial input data DIN. The least significant bit REG0 participates in the data determination function of the power consumption mode determination module 13; in one example, the trigger units 101 are implemented using D Flip-flops (though JK Flip-flops or other structures implementing D Flip-flops may also be used).

It should be noted that any circuit structure capable of sequentially outputting each data bit in the serial input data DIN without mutual interference among bits is applicable to the data serial-to-parallel module 10 of the present disclosure. The clock signal clk_sample can be introduced into the circuit or not depending on the needs of the actual circuit. In the above example of the present disclosure, power consumption control is achieved solely based on the least significant bit REG0; in practical use, all bits of the parallel data, REG7, REG6, REG5, REG4, REG3, REG2, REG1, REG0, need to be output and may serve as a control basis for other circuits (including but not limited to to-be-controlled circuits).

As shown in FIG. 1, the data counting module 11 receives the serial input data DIN and counts a quantity of valid data bits of the serial input data DIN, generating a valid flag bit data_vaild_flag when the quantity of valid data bits of the serial input data DIN reaches a preset value.

Specifically, in one example, the preset value is equal to M*R, M is a quantity of LED channels and R is a bit depth of grayscale data for each LED channel; M is a natural number greater than or equal to 1, and R is a natural number greater than or equal to 1. The data counting module 11 counts the number of valid data bits of the serial input data DIN received by the LED driver circuit. If the LED driver circuit receives some erroneous data signals (such as spike signals, which are invalid data) or the number of data bits does not reach the preset value, the flag bit data_valid_flag remains 0 (invalid state); If the LED driver circuit receives normal data signals (valid data), and the data counting module 11 counts to M*R, the output signal data_valid_flag from the data counting module 11 becomes a positive pulse signal (valid state), with the pulse width ranging from a few nanoseconds to a few hundred nanoseconds. The flag bit data_valid_flag will participate in the data determination function of the power consumption mode determination module 13.

It should be noted that the preset value can be set according to actual needs, allowing the to-be-controlled circuit to acquire complete signals. The definitions of M and R are determined according to specific requirements and are not restricted by examples of the present disclosure.

As shown in FIG. 1, the data latch control module 12 generates a valid latch pulse data_lock after the LED driver circuit (to-be-controlled circuit) completes reception and transmission of data.

Specifically, in one example, the data latch control module 12 is equipped with a timer, when data is inputted (the input data includes but is not limited to the valid data required for the operation of the LED driver circuit and the data forwarded to other cascaded circuits) into the LED driver circuit, these data will reset the timer, after the data transmission is completed and the timer reset ends, the timer begins counting, and when the counting value reaches a set value of the timer, the valid latch pulse data_lock is outputted, the latch pulse data_lock allows the LED driver circuit to latch the valid data, the pulse width of the latch pulse data_lock can be from a few nanoseconds to a few microseconds. The latch pulse data_lock participates in the latching of the power consumption enabling determination result and the reset of the data determination result in the power consumption mode determination module 13.

It should be noted that the structure of the data latch control module 12 is not limited, any structure capable of triggering a pulse signal after the controlled circuit completes the reception and transmission of data is applicable to the present disclosure.

As shown in FIG. 1, the power consumption mode determination module 13 is connected to an output terminal of the data serial-to-parallel module 10, the data counting module 11, and the data latch control module 12, the power consumption mode determination module 13 receives the serial input data DIN and the power-on reset signal Reset of the LED driver circuit (to-be-controlled circuit), and generates a power consumption control signal Power_ctr for the LED driver circuit (to-be-controlled circuit); and the LED driver circuit (to-be-controlled circuit) enters a working mode when valid data contains LED lighting instruction therein is received (the LED driver circuit is necessary to control its downstream circuit); otherwise, the LED driver circuit (to-be-controlled circuit) enters a power-saving mode.

Specifically, in one example, the power consumption mode determination module 13 includes a data determination unit 131, a power consumption mode determination result latch unit 132, and a reset unit 133.

Figure 3:
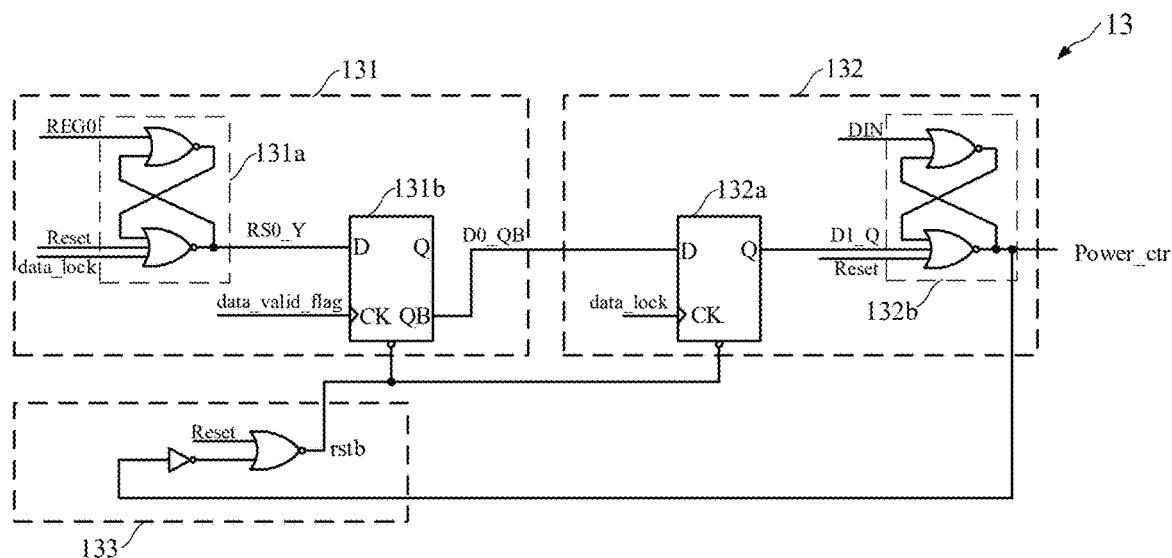
FIG. 3 shows a schematic structural diagram of a power consumption mode determination module according to one embodiment of the present disclosure.

More specifically, the data determination unit 131 determines whether the LED driver circuit has received valid data and whether the valid data contains LED lighting instruction therein, based on output signals from the data serial-to-parallel module 10 and the data latch control module 12, and resets the data determination unit 131 when the power-on reset signal Reset or the latch pulse data_lock is valid; as shown in FIG. 3, as an example, the data determination unit 131 includes a first RS flip-flop 131a and a first D flip-flop 131b. A first reset terminal of the first RS flip-flop 131a receives the power-on reset signal Reset, and a second reset terminal of the first RS flip-flop 131a receives the latch pulse data_lock, a set terminal of the first RS flip-flop 131a is connected to the output terminal of the data serial-to-parallel module 10 (the lowest bit of data REG0), outputting the determination result RS0_Y; in one example, the first RS flip-flop 131a is implemented using two NOR gates, and in practice, any circuit structure capable of achieving the RS flip-flop function is applicable to the present disclosure. During the power-on reset period or the valid level of the latch pulse data_lock, the output of the first RS flip-flop 131a is reset to level 0; when all bits of the valid data of the LED driver circuit are 0 (indicating that no LED needs to be lit in one example and indicating that the to-be-controlled circuit does not need to control its downstream circuit in actual use), it shows that the LED driver circuit does not need to drive and light up the LED. The LED driver circuit can remain in (if the current state is the power-saving mode) or switch to the power-saving mode (if the current state is the working mode). At this point, the output of the first RS flip-flop 131a is RS0_Y=0. When any bit of the valid data of the LED driver circuit is 1 (indicating lighting up the corresponding LED in one example and indicating that the to-be-controlled circuit needs to control its downstream circuit in practice), it shows that the LED driver circuit needs to drive and light up the LED, the LED driver circuit can remain in (if the current state of the LED chip is the working mode) or switch to the working mode (if the current state of the LED chip is the power-saving mode). At this point, the output of the first RS flip-flop 131a is RS0_Y=1. Thus, the first RS flip-flop 131a realizes the condition determination of whether the LED needs to be driven to light up (whether the to-be-controlled circuit needs to control its downstream circuits). A data input terminal D of the first D flip-flop 131b is connected to an output terminal of the first RS flip-flop 131a, a clock terminal CK of the first D flip-flop 131b receives the flag bit data_valid_flag, a reset terminal of the first D flip-flop 131b receives the second reset signal rstb provided by the reset unit 133, an inverted output terminal of the first D flip-flop 131b serves as an output terminal of the data determination unit 131 (an output signal D0_QB of the data determination unit 131); when the flag bit data_valid_flag is invalid (low level), the first D flip-flop 131b cannot latch the determination result of the first RS flip-flop 131a, and when the flag bit data_valid_flag is valid (positive pulse signal), the first D flip-flop 131b latches the determination result of the first RS flip-flop 131a under the action of the positive pulse signal.

Thus, through the combined action of the first RS flip-flop 131a and the first D flip-flop 131b, when the LED driver circuit receives valid data, and there is any bit of 1 (lighting the corresponding LED) in the valid data, it represents that the LED driver circuit needs to drive and light up the LED, the LED driver circuit can remain in (if the current state is the working mode) or switch to the working mode (if the current state is the power-saving mode), at which point, the first D flip-flop 131b outputs D0_QB=0; when the LED driver circuit receives invalid data or all bits of valid data are 0 (no LED needs to be lit), it represents that the LED driver circuit does not need to drive and light up the LED, the LED driver circuit can remain in (if the current state is the power-saving mode) or switch to the power-saving mode (if the current state is the working mode), at which point, the first D flip-flop 131b outputs D0_QB=1.

More specifically, the power consumption mode determination result latch unit 132 generates the power consumption control signal Power_ctr based on an output signal from the data determination unit 131 and the latch pulse data_lock. As shown in FIG. 3, as an example, the power consumption mode determination result latch unit 132 includes a second D flip-flop 132a and a second RS flip-flop 132b. A data input terminal D of the second D flip-flop 132a is connected to the output terminal of the data determination unit 131, a clock terminal CK of the second D flip-flop 132a receives the latch pulse data_lock, and a reset terminal of the second D flip-flop 132a receives the second reset signal rstb, outputting the signal D1_Q. When the latch pulse data_lock is valid (positive pulse), the output signal D0_QB of the data determination unit 131 is latched by the second D flip-flop 132a, when the latch pulse data_lock is invalid (low level), the output signal D0_QB of the data determination unit 131 is not latched by the second D flip-flop 132a. A first reset terminal of the second RS flip-flop 132b is connected to an output terminal of the second D flip-flop 132a, a second reset terminal of the second RS flip-flop 132b receives the power-on reset signal Reset, a set terminal of the second RS flip-flop 132b receives the serial input data DIN, and an output terminal of the second RS flip-flop 132b outputs the power consumption control signal Power_ctr. In one example, the second RS flip-flop flop 132b is implemented using two NOR gates, and in actual use, any circuit structure capable of achieving the RS flip-flop function is applicable to the present disclosure. After the LED driver circuit is powered on and reset, the power consumption control signal Power_ctr output by the second RS flip-flop 132b remains 0, controlling the LED driver circuit to be in the power-saving mode, when the LED driver circuit receives the serial input data DIN, whether it is valid data or invalid data, the power consumption control signal Power_ctr output by the second RS flip-flop 132b changes to 1, controlling the LED driver circuit to switch to the normal working mode; then, based on an output signal of the data determination unit 131, it is determined whether an output of the second RS flip-flop 132b remains 1 (controlling the LED driver circuit to remain in the working mode) or switches to 0 (controlling the LED driver circuit to switch to the power-saving mode): If data received by the LED driver circuit is valid data, and there is any bit of 1 in the valid data, an output of the data determination unit 131 is D0_QB=0, and under an action of the latch pulse data_lock, the second D flip-flop 132a latches D0_QB, i.e., an output D1_Q of the second D flip-flop 132a is 0, keeping the power consumption control signal Power_ctr output by the second RS flip-flop 132b at 1, thereby controlling the LED driver circuit to remain in the working mode, if the LED driver circuit receives invalid data, or receives valid data of all 0, the output of the data determination unit 131 is D0_QB=1, and under the action of the latch pulse data_lock, the second D flip-flop 132a latches D0_QB, i.e., the output D1_Q of the second D flip-flop 132a is 1, changing the power consumption control signal Power_ctr output by the second RS flip-flop 132b to 0, thereby controlling the LED driver circuit to switch to the power-saving mode.

More specifically, the reset unit 133 is connected to an output terminal of the power consumption mode determination result latch unit 132 and receives the power-on reset signal Reset, generating a second reset signal rstb when the power-on reset signal Reset is valid or when the LED driver circuit transitions from the working mode to the power-saving mode, to reset the data determination unit 131 and the power consumption mode determination result latch unit 132. As shown in FIG. 3, as an example, the reset unit 133 includes an inverter and a second NOR gate. An input terminal of the inverter is connected to the power consumption control signal Power_ctr, and the output terminal of the inverter is connected to a first input terminal of the second NOR gate; and a second input terminal of the second NOR gate receives the power-on reset signal Reset and outputs the second reset signal rstb.

In one example, the power consumption control circuit 1 ensures that the LED driver circuit is in the power-saving mode when powered on, and when the LED driver circuit receives valid data and needs to drive and illuminate the LED lights, it outputs a control signal to switch the LED driver circuit to the normal working mode, achieving a simple, flexible, and reliable circuit.

It should be noted that the level (high or low) and pulse (positive or negative) corresponding to an active signal in this invention can be set according to actual needs. The circuit connections can be adaptively adjusted to achieve the logical relationships of the present disclosure.

The present disclosure also provides a chip, the chip includes the power consumption control circuit 1 described above. The power consumption control circuit 1 provides the power consumption control signal Power_ctr to the to-be-controlled circuit, thereby reducing the energy consumed by the circuit itself during non-working periods.

Figure 4:
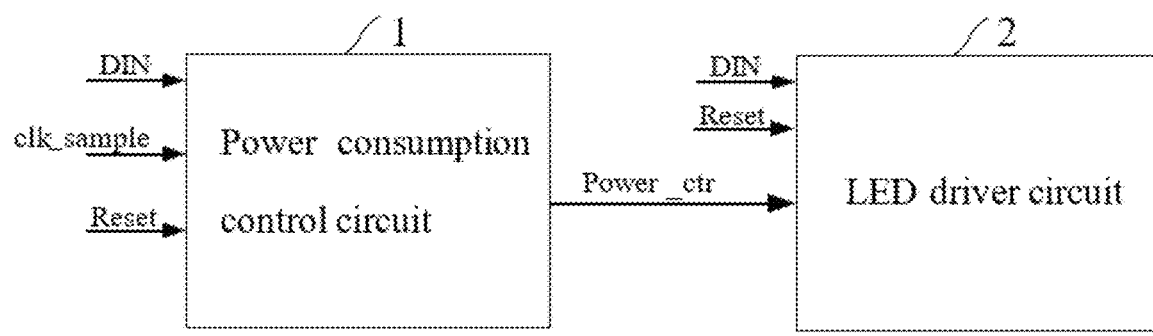
FIG. 4 shows a schematic structural diagram of a chip or an electronic device according to one embodiment of the present disclosure.

As shown in FIG. 4, the present disclosure also provides an electronic device, the electronic device includes: the power consumption control circuit 1 described above and a to-be-controlled circuit. In one example, the to-be-controlled circuit is an LED driver circuit 2. The power consumption control circuit 1 provides the power consumption control signal Power_ctr to the LED driver circuit 2, and the LED driver circuit 2 enters the working mode or the power-saving mode based on the control of the power consumption control signal Power_ctr, thereby reducing the energy consumed by the LED driver circuit itself during non-working periods. As an example, the LED driver circuit 2 is also driven based on, but not limited to, the serial input data DIN and the power-on reset signal Reset. The power consumption control circuit 1 can effectively reduce the energy consumed by the LED driver circuit itself during non-working periods, extending the battery runtime of the electronic device (especially portable electronic devices).

Currently, in mainstream LED color light circuit designs on the market, the typical no-load current of a single driver chip is between 200 uA and 600 uA. For a strip with 1,000 lights or a small LED display, the standby current when the entire strip or screen is not displayed is still between 0.2 A and 0.6 A. When powered by a 5 V power supply, this standby power consumption is 1 W to 3 W. With the power consumption control circuit, the chip, and the electronic device of the present disclosure, the standby power consumption of LED application light strips or LED displays can be significantly reduced.

In summary, the present disclosure provides the power consumption control circuit, the chip, and the electronic device, including: the data serial-to-parallel module, the data counting module, the data latch control module, and the power consumption mode determination module; the data serial-to-parallel module receives the serial input data of the to-be-controlled circuit, converts the serial input data into parallel data, and sequentially outputs the least significant bit of the parallel data, where the to-be-controlled circuit controls the downstream circuit based on the serial input data; the data counting module receives the serial input data and counts the number of valid data bits in the serial input data, generating a valid flag bit when the number of valid data bits in the serial data reaches a preset value; the data latch control module generates a valid latch pulse after the to-be-controlled circuit completes the reception and transmission of the data; the power consumption mode determination module is connected to the output terminals of the data serial-to-parallel module, the data counting module, and the data latch control module, and receives the serial input data and the power-on reset signal of the to-be-controlled circuit, generating the power consumption control signal of the to-be-controlled circuit; when the to-be-controlled circuit receives valid data and needs to control the downstream circuit, the power consumption control signal controls the to-be-controlled circuit to enter the working mode; otherwise, the power consumption control signal controls the to-be-controlled circuit to enter the power-saving mode. The power consumption control circuit, the chip, and the electronic device of the present disclosure output control signals that can shut down each working module of the to-be-controlled circuit, putting the to-be-controlled circuit into the power-saving mode when the to-be-controlled circuit does not receives data, receives invalid data, or does not need to control the downstream circuit; when the to-be-controlled circuit receives valid data and needs to control the downstream circuit, the output control signal can turn on each working module of the to-be-controlled circuit, allowing the to-be-controlled circuit to enter the normal working mode. Therefore, the present disclosure effectively overcomes various shortcomings in the existing technology and has high industrial utilization value.

The above-mentioned embodiments are merely illustrative of the principle and effects of the present disclosure instead of restricting the scope of the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A power consumption control circuit, for controlling a power consumption of a to-be-controlled circuit, wherein the power consumption control circuit comprises:
   a data serial-to-parallel module, a data counting module, a data latch control module, and a power consumption mode determination module;
   wherein the data serial-to-parallel module receives serial input data from the to-be-controlled circuit, converts the serial input data into parallel data, and sequentially outputs least significant bits of the parallel data, wherein the to-be-controlled circuit controls a downstream circuit based on the serial input data;
   wherein the data counting module receives the serial input data and counts a quantity of valid data bits of the serial input data, generating a valid flag bit when the quantity of valid data bits reaches a preset value;
   wherein the data latch control module generates a valid latch pulse after the to-be-controlled circuit completes reception and transmission of data; and
   wherein the power consumption mode determination module is connected to output terminals of the data serial-to-parallel module, the data counting module, and the data latch control module, wherein the power consumption mode determination module receives the serial input data and a power-on reset signal of the to-be-controlled circuit, and generates a power consumption control signal for the to-be-controlled circuit; and wherein the to-be-controlled circuit enters a working mode when valid data is received and it is necessary to control the downstream circuit; otherwise, the to-be-controlled circuit enters a power-saving mode.

2. The power consumption control circuit according to claim 1, wherein the data serial-to-parallel module also receives the power-on reset signal of the to-be-controlled circuit and the latch pulse provided by the data latch control module, and resets the data serial-to-parallel module when the power-on reset signal or the latch pulse is valid.

3. The power consumption control circuit according to claim 1, wherein the data serial-to-parallel module comprises N trigger units and a logic unit;
wherein the logic unit receives the power-on reset signal and the latch pulse, and
generates a first reset signal when the power-on reset signal or the latch pulse is valid;
wherein the trigger units are connected in series, each of which has a clock terminal connected to a clock signal and a reset terminal connected to the first reset signal; a triggering based on the clock signal sequentially transmits bits of the serial input data; and
wherein N is a natural number greater than or equal to 1.

4. The power consumption control circuit according to claim 3, wherein the logic unit is a NOR gate or an inverter.

5. The power consumption control circuit according to claim 3, wherein the trigger unit is a D flip-flop.

6. The power consumption control circuit according to claim 3, wherein when the to-be-controlled circuit is an LED driver circuit, the preset value is equal to M*R, wherein M is a quantity of LED channels and R is a bit depth of grayscale data for each LED channel; wherein M is a natural number greater than or equal to 1, and R is a natural number greater than or equal to 1.

7. The power consumption control circuit according to claim 1, wherein the power consumption mode determination module comprises a data determination unit, a power consumption mode determination result latch unit, and a reset unit;
wherein the data determination unit determines whether the to-be-controlled circuit has received valid data and whether it is necessary to control the downstream circuit, based on output signals from the data serial-to-parallel module and the data latch control module, and resets the data determination unit when the power-on reset signal or the latch pulse is valid;
wherein the power consumption mode determination result latch unit generates the power consumption control signal based on an output signal from the data determination unit and the latch pulse; and
wherein the reset unit is connected to an output terminal of the power consumption mode determination result latch unit and receives the power-on reset signal, generating a second reset signal when the power-on reset signal is valid or when the to-be-controlled circuit transitions from the working mode to the power-saving mode, to reset the data determination unit and the power consumption mode determination result latch unit.

8. The power consumption control circuit according to claim 7, wherein the data determination unit comprises a first RS flip-flop and a first D flip-flop; wherein a first reset terminal of the first RS flip-flop receives the power-on reset signal, a second reset terminal of the first RS flip-flop receives the latch pulse, and a set terminal of the first RS flip-flop is connected to an output terminal of the data serial-to-parallel module; wherein a data input terminal of the first D flip-flop is connected to an output terminal of the first RS flip-flop, the clock terminal of the first D flip-flop receives the flag bit, a reset terminal of the first D flip-flop receives the second reset signal, and an inverted output terminal of the first D flip-flop serves as an output terminal of the data determination unit.

9. The power consumption control circuit according to claim 7, wherein the power consumption mode determination result latch unit comprises a second D flip-flop and a second RS flip-flop; wherein a data input terminal of the second D flip-flop is connected to the output terminal of the data determination unit, a clock terminal of the second D flip-flop receives the latch pulse, and a reset terminal of the second D flip-flop receives the second reset signal; wherein a first reset terminal of the second RS flip-flop is connected to an output terminal of the second D flip-flop, a second reset terminal of the second RS flip-flop receives the power-on reset signal, a set terminal of the second RS flip-flop receives the serial input data, and an output terminal of the second RS flip-flop outputs the power consumption control signal.

10. The power consumption control circuit according to claim 8, wherein the first RS flip-flop comprises two NOR gates.

11. The power consumption control circuit according to claim 9, wherein the second RS flip-flop comprises two NOR gates.

12. The power consumption control circuit according to claim 7, wherein the reset unit comprises an inverter and a second NOR gate; wherein an input terminal of the inverter is connected to the power consumption control signal, and the output terminal of the inverter is connected to a first input terminal of the second NOR gate; and a second input terminal of the second NOR gate receives the power-on reset signal and outputs the second reset signal.

13. A chip, wherein the chip comprises: a power consumption control circuit as described in claim 1.

14. An electronic device, wherein the electronic device comprises: a to-be-controlled circuit and a power consumption control circuit as described in claim 1.

15. The electronic device according to claim 14, wherein the to-be-controlled circuit is an LED driver circuit.

* * * * *